United States Patent Office 3,428,696
Patented Feb. 18, 1969

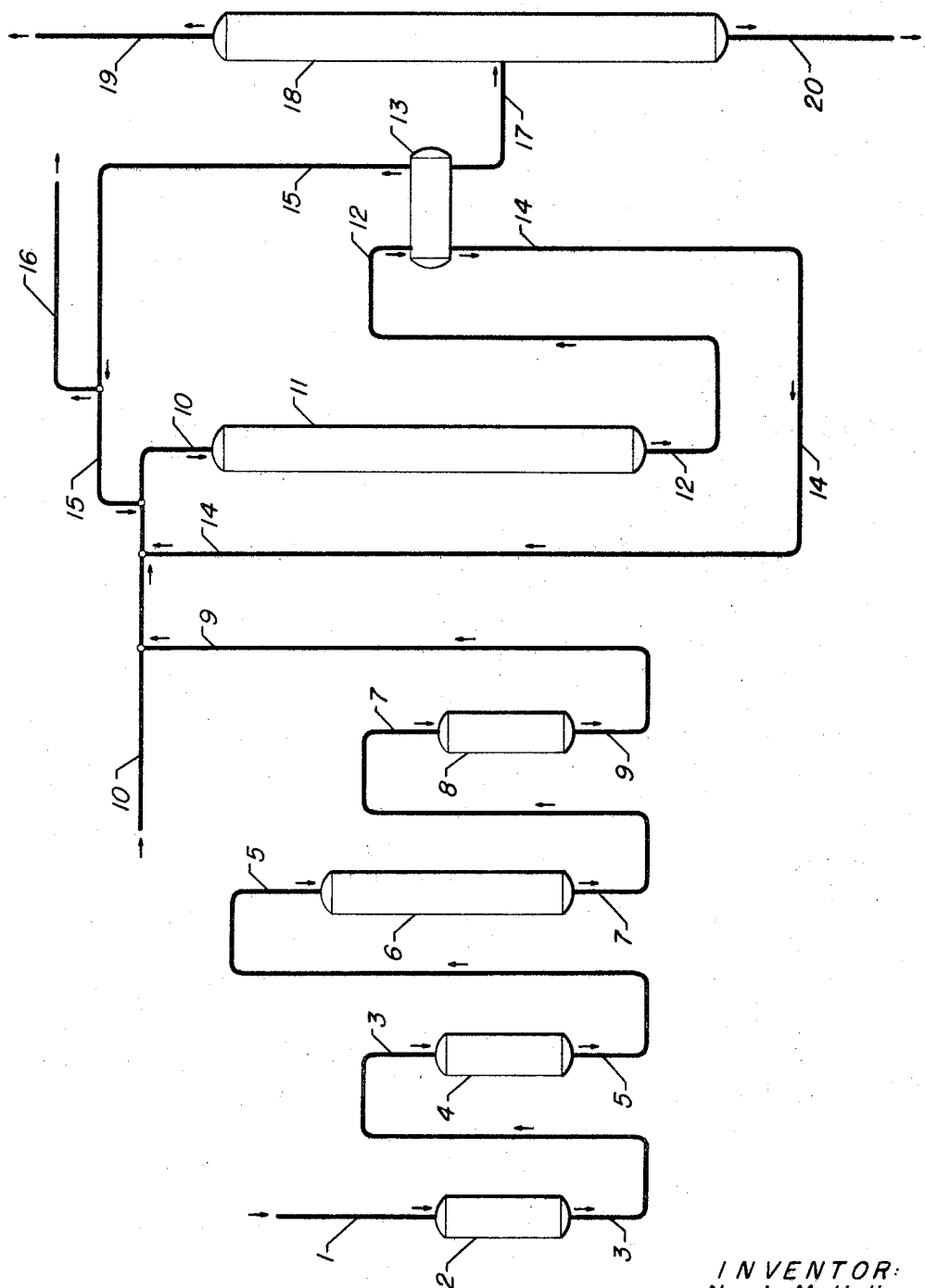

3,428,696
HYDROGENATION OF BENZENE
TO CYCLOHEXANE
Newt M. Hallman, Mount Prospect, Ill., assignor to Universal Oil Products Company, Des Plaines, Ill., a corporation of Delaware
Filed Dec. 27, 1966, Ser. No. 604,739
U.S. Cl. 260—667                                    13 Claims
Int. Cl. C07c 3/42, 3/58, 5/10

ABSTRACT OF THE DISCLOSURE

Process for the manufacture of cyclohexane utilizing a hydrogen feed contaminated with hydrocarbon vapors which comprises passing the hydrogen-rich feed stream into a conditioning zone under conditions sufficient to thermally or catalytically hydrocrack or hydrodealkylate the contaminants sufficiently to render the hydrogen-rich stream substantially free of $C_6+$ hydrocarbons, passing the conditioned hydrogen without intervening separation or withdrawal of hydrocarbon vapor into a hydrogenation zone with benzene, and receiving high purity cyclohexane.

---

The subject invention relates to the manufacture of cyclohexane by the hydrogenation of benzene. In particular, this invention relates to the manufacture of cyclohexane by the hydrogenation of benzene utilizing a hydrogen stream contaminated by hydrocarbon vapor. Most particularly, this invention relates to the conditioning of the contaminated hydrogen stream to make it more amenable for use in the manufacture of cyclohexane.

Cyclohexane finds utility as a precursor for various chemicals such as cyclohexanol, cyclohexanone, phenol, adipic acid, caprolactam, and other industrial chemicals. The biggest end use for cyclohexane is in the manufacture of nylon, with adipic acid being utilized to manufacture nylon 6 and caprolactam being utilized to manufacture nylon 66. Adipic acid synthesized from cyclohexane is further utilized in the manufacture of plasticizers and lubricants. Cyclohexane is also used as a solvent for cellulose ethers, fats and oils, rubber, and esential oils, and it is used as a paint remover.

In the hydrogenation process to which this invention is directed, one mole of benzene is hydrogenated by 3 moles of hydrogen to produce cyclohexane. It is customary in the art to provide high purity benzene by solvent extraction of catalytic reformates and at the reaction conditions chosen in the hydrogenation process, the equilibrium toward cyclohexane is so favorable that essentially all of the high purity benzene is converted to cyclohexane.

It is also generally the art to use catalytic reformer vent gas as the hydrogen source for the hydrogenation of the benzene. However, this gas is usually contaminated by low molecular weight hydrocarbons, sulfur compounds, oxygen compounds, and hexane and heavier hydrocarbons. These hexane and heavier hydrocarbons have, in great measure, boiling points which coincide with the boiling point of cyclohexane. For example, the boiling point of cyclohexane is 80.738° C. and that of 2,2,3-trimethylbutane is 80.882° C. In addition, 2,4-dimethylpentane boils at 80.500° C., and 2,2-dimethylpentane boils at 79.197° C. These $C_6+$ hydrocarbons therefore are absorbed in the cyclohexane product and require extensive fractionation for removal. It is also to be noted that certain of the $C_6+$ hydrocarbons form azeotropes with cyclohexane and hence are not separable by conventional distillation. (As used herein, $C_6+$ refers to hydrocarbons having six or more carbon atoms per molecule.)

At least three techniques have been suggested or utilized for the removal of these $C_6+$ hydrocarbons from the hydrogen rich reformer off-gas. The first method comprises the steps of absorption and subsequent stripping of the rich oil. The second method comprises adsorption with a material such as activated charcoal or molecular sieves. This route involves a stripping cycle as well. The third procedure which may be utilized is the refrigeration of the reformer off-gas to condense out the heavier hydrocarbons. In these three prior art techniques, not only are the $C_6+$ hydrocarbons removed from the hydrogen rich reformer gas, but butanes and pentanes are normally removed as well. It is to be noted further that the prior art withdraws the butanes, pentanes, and $C_6+$ hydrocarbons from the hydrogen stream, thus increasing the hydrogen purity of the reformer off-gas.

It is an object of the present invention to manufacture cyclohexane by hydrogenation of benzene while utilizing hydrogen contaminated with hydrocarbon vapor. It is a further object to manufacture cyclohexane by utilizing hydrogen-rich reformer off-gas which has been rendered substantially free of $C_6+$ vapor. It is another object of this invention to manufacture cyclohexane by utilizing reformer off-gas which has been rendered substantially free of $C_6+$ hydrocarbon in a conditioning zone without separation or withdrawal of hydrocarbon vapor from the hydrogen-rich off-gas stream. It is still another object of this invention to manufacture cyclohexane by a more economical and facile process.

Therefore, this invention comprises a method of removing the $C_6+$ hydrocarbons from the reformer off-gas by subjecting the gas to conditions sufficient to hydrocrack these heavier components. The hydrocracking of the $C_6+$ hydrocarbons may be done under elevated pressure and temperature as a thermal hydrocracking step, or the hydrocracking of the hydrocarbons may be catalytically promoted.

These objectives may therefore be achieved in a process for the production of cyclohexane which comprises passing a hydrogen feed containing hydrocarbon vapors having six or more carbon atoms per molecule, into a conditioning zone under conditions sufficient to hydrocrack substantially all of the hydrocarbon vapor to less than 6 carbon atoms per molecule; withdrawing from said conditioning zone a first effluent stream comprising hydrogen and hydrocarbon vapors which are substantially free of hydrocarbons containing six or more carbon atoms per molecule; passing said first effluent stream and said benzene feed into a reaction zone containing a hydrogenation catalyst under conditions sufficient to hydrogenate benzene; withdrawing from said reaction zone a second effluent comprising hydrogen, cyclohexane and hydrocarbon vapors which are substantially free of hydrocarbons containing six or more carbon atoms per molecule; separating said second effluent into at least a first product stream comprising hydrogen, a second product stream comprising hydrocarbon vapors which are substantially free of hydrocarbons having six or more carbon atoms per molecule, and a third product stream comprising high purity cyclohexane; and recovering said third product stream.

The second embodiment of the present invention comprises a process as set forth in the paragraph above with the condition that the conditioning zone contain a hydrocracking catalyst.

In a third embodiment of the present invention the process comprises passing a hydrogen feed containing hydrocarbon vapor having six or more carbon atoms per molecule, said vapor consisting of cyclic hydrocarbon vapor and noncyclic hydrocarbon vapor, into a conditioning zone containing a hydrodealkylation catalyst under conditions sufficient to hydrocrack substantially all of the non-cyclic hydrocarbon vapor to less than 6 carbon atoms per molecule, and sufficient to hydrodealkylate substantially all cyclic hydrocarbon vapor to cyclic hydrocarbon vapor having 6 carbon atoms per molecule; withdrawing from the conditioning zone a first effluent stream comprising hydrogen, cyclic hydrocarbon vapor having 6 carbon atoms per molecule, and non-cyclic hydrocarbon vapor which is substantially free of hydrocarbons having six or more carbon atoms per molecule; passing said first effluent stream, without intervening separation, and a benzene feed into a reaction zone containing a hydrogenation catalyst under conditions sufficient to hydrogenate benzene; withdrawing from said reaction zone a second effluent comprising hydrogen, cyclohexane and non-cyclic hydrocarbon vapor which is substantially free from hydrocarbons having six or more carbon atoms per molecule; separating said second effluent into at least a first product stream comprising hydrogen, a second product stream comprising non-cyclic hydrocarbon vapor which is substantially free from hydrocarbons having six or more carbon atoms per molecule and a third product stream comprising high purity cyclohexane; and recovering said third product stream.

A clearer understanding of the process of the present invention may be obtained by now referring to the attached drawing, which is a diagrammatic representation of apparatus for practicing an embodiment of the invention.

A hydrogen-rich reformer vent gas enters the process of the present invention via line 1, normally at a temperature of 60° F. to 100° F. and a pressure of from 300 p.s.i.g. to 800 p.s.i.g. The hydrogen gas enters a sulfur removal zone 2 which comprises an aqueous absorbing system and a stripping system. Normally, aqueous organic amines such as aqueous dietholamine, aqueous sulfolane or other solvents are used to absorb any hydrogen sulfide out of the reformer off-gas. The process of sulfur removal by such scrubbing is well known in the hydrocarbon art, and need not be completely described herein. The scrubbed hydrogen-rich gas leaves the sulfur removal zone 2 via line 3 and enters a caustic wash zone 4. This zone contains aqueous caustic and substantially removes the last traces of hydrogen sulfide.

The sulfur-free (e.g., less than 10 p.p.m. $H_2S$) reformer gas leaves the caustic wash zone via line 5 at a temperature of about 60° F. to 100° F. and enters a conditioning zone 6 wherein thermal hydrocracking conditions are maintained. The temperature within this zone is maintained in the range of from about 1000° F. to about 1500° F. It is preferable that this temperature level be maintained as low as possible in order to avoid vessel fabrication problems which involve high alloy metallurgy. It is therefore advantageous to operate this zone at as high a pressure as possible. In general, the thermal hydrocracking will occur at pressures in the range of from about 100 p.s.i.g. to 3000 p.s.i.g. Normally, however, this zone may be maintained at a pressure which is in the range of that of the catalytic reformer which supplies the hydrogen-rich gas, thus eliminating the need for expensive compressor means. As an alternative, this pressure may be maintained at substantially the same level as the subsequent hydrogenation zone 11 which will be described hereinafter. In summary, reaction zone 6 will normally be operated at a pressure in the range of from about 300 p.s.i.g. to 800 p.s.i.g.

The thermal hydrocracking reactions which occur within this zone will reduce the number of carbon atoms per molecule in the hydrocarbon vapor. Generally, complete cracking of the hydrocarbon will produce substantially methane and ethane, but if operating conditions are properly adjusted, only sufficient hydrocracking to eliminate $C_6+$ hydrocarbon vapors is undertaken. The operating conditions which will be required to obtain this optimum degree of hydrocracking, and thereby minimize unnecessary hydrogen consumption, may be readily ascertained by those skilled in the art. Among the factors which are involved are temperature, pressure, and residence time within the reaction zone.

The hydrocracking gas stream now leaves the conditioning zone 6, preferably with no separation or recovery of any hydrocarbon species therein, and it passes via line 7 into a methanation reaction zone 8. This reactor is provided because the hydrogen gas from catalytic reforming units normally will contain traces of carbon monoxide and carbon dioxide. These oxides of carbon, and particularly carbon monoxide, as well as any other oxides in the gas, are detrimental to the catalyst in hydrogenation zone 11 to be described hereinbelow, and they will be hydrogenated in this zone 8 to produce methane and water. Generally, this reaction is run at a pressure of 400 to 500 pounds per square inch and at a temperature of about 400° F. One catalyst which is used in this zone typically comprises nickel on keiselguhr. This reaction system is also well known in the art and need not be described herein in great detail.

The hydrogen-rich gas which is now substantially free of hydrocarbon vapor having six or more carbon atoms per molecule, leaves the methanation reaction zone 8 via line 9 and enters line 10 where it first is contacted with the fresh benzene entering the inventive process via line 10. This combined stream is then diluted with recycle cyclohexane product which enters line 10 via line 14 from a source to be hereinafter described. This stream in line 10 then is further diluted with a hydrogen-rich recycle gas which enters line 10 via line 15 from a source to be described hereinafter. The total stream continues in line 10 and enters the hydrogenation reaction zone 11.

This reaction zone 11 comprises a hydrogenation reaction system wherein cyclohexane is produced by passing the mixture of benzene, cyclohexane, and hydrogen-rich gas at a temperature of from about 325° F. to about 400° F. and a pressure of from about 200 p.s.i.g. to about 600 p.s.i.g. across a suitable hydrogenation catalyst. In passing through the hydrogenation catalyst zone, the temperature of the reactants increases as benzene is hydrogenated to cyclohexane. After substantially complete hydrogenation, the reactants are withdrawn from the catalytic zone at a temperature of from about 500° F. to about 600° F. via line 12 and upon subsequent cooling to a temperature of from about 60° F. to about 100 F., by means not shown, are introduced into separator 13.

The effluent from the reaction zone 11 which is received in the separator 13 is separated therein to provide a gaseous phase which is rich in hydrogen and a liquid phase which is substantially pure cyclohexane. A part of the liquid cyclohexane is withdrawn from separator 13 via line 14 and passed to line 10 as previously set forth in order to provide a diluent or quench for controlling the exothermicity of the reaction zone. The hydrogen-rich gas stream is withdrawn from separator 13 via line 15 and a substantial portion passes into line 10 as previously set forth, also for the purpose of providing a diluent or quench in order to maintain the proper temperature control within the reaction zone. Because of the continuing introduction of make-up reformer gas into this process, light hydrocarbon vapors will continue to build up in the system and a net vent gas must therefore be withdrawn from the process via line 16. This vent gas product will be rich in hydrogen and will contain hydrocarbon vapors having, for the most part, less than six carbon atoms per molecule.

The hydrogenation reaction system of reaction zone 11 may be composed of more than one reaction vessel. A particularly preferred combination of reaction vessels is disclosed in U.S. Patent No. 2,755,317 issued to L.S. Kassel. The hydrogenation reaction system as set forth therein employs multiple reactors wherein the benzene is charged to each reactor in parallel, while the hydrogen and the effluent from preceding reactors are charged in series.

A particularly preferred catalyst which is utilized within the hydrogenation reaction zone 11 may be comprised of nickel, platinum, palladium, iron, etc., Raney nickel, or any active hydrogenation catalyst, which preferably is composited with a carrier such as alumina, silica, keiselguhr, diatomaceous earth, magnesia, zirconia, or other inorganic oxides either alone or in combination. A preferred catalyst which is utilized within this zone comprises nickel on keiselguhr, although platinum on alumina and nickel on alumina may also be utilized as preferred catalysts.

A net liquid cyclohexane is withdrawn from separator 13 and introduced via line 17 into a fractionating column 18. Fractionating column 18 is operated at conditions sufficient to stabilize the cyclohexane. A net overhead stream is withdrawn via line 19 and comprises a large percentage of hydrogen and a substantial percentage of light hydrocarbon vapors having less than 6 carbon atoms per molecule. This stream may then be cooled and condensed and a part of the liquid hydrocarbon may be introduced back into the top of column 18 as reflux if so desired. A net cyclohexane product stream which is substantially free of light hydrocarbon and which has a high purity, normally in excess of 99.7 mol. percent, is withdrawn from the inventive process and sent to final product storage via line 20. Where very high purity benzene is fed to the inventive process, the cyclohexane product in line 20 will be found to have a purity of from 99.90 mol percent to 99.95 mol percent.

The effectiveness of the present invention may be seen by reference to Table I below. The first two columns comprise an analysis of a typical catalytic reformer vent gas containing approximately 10% of hydrocarbon vapors. By operation of the conditioning zone 6 at a temperature of 1250° F., a pressure of 500 pounds per square inch, and a space velocity of 120 1/hours, the reformer gas is typically hydrocracked to yield the component distribution indicated in the last two columns.

TABLE I.—HYDROCRACKING OF REFORMER OFF-GAS

| Component | In Line 5 to Conditioning Zone 6 | | In Line 7 From Conditioning Zone 6 | |
|---|---|---|---|---|
| | Moles/ hr. | Mole percent | Moles/ hr. | Mole percent |
| Hydrogen | 537 | 90.10 | 498.09 | 83.57 |
| Methane | 12 | 2.02 | 59.70 | 10.02 |
| Ethane | 17 | 2.85 | 22.20 | 3.73 |
| Propane | 17 | 2.85 | 12.70 | 2.13 |
| Butanes | 8 | 1.34 | 2.77 | 0.46 |
| Pentanes | 3 | 0.50 | 0.54 | 0.09 |
| Hexane and Heavier | 2 | 0.34 | | |
| Total | 596 | 100.00 | 596.00 | 100.00 |

It will be seen from the table that the $C_{6+}$ hydrocarbon within the hydrogen-rich gas was substantially eliminated. At the same time, the hydrogen purity of the gas was reduced from 90.10 mol percent to 83.57 mol percent. This hydrogen purity is more than adequate for the catalytic hydrogenation of benzene to produce cyclohexane, since hydrogen purity may be as low as 35 to 40 mol percent without detriment to the benzene hydrogenation reaction provided that the zone pressure is at least 400 p.s.i.g. Similar effective reduction of $C_{6+}$ hydrocarbons within any given reformer vent gas may be obtained.

It is to be noted that in the example defined hereinabove, the operating conditions within the conditioning zone were judiciously chosen in order to eliminate $C_{6+}$ hydrocarbon without completely cracking all hydrocarbon vapors to produce substantially all methane and ethane. As the temperature of the conditioning zone is increased above 1250° F. for this reformer off-gas, say to 1300° F., substantially all pentanes will be cracked thus producing more methane and ethane. As the temperature is reduced below 1250° F., say to 1200° F., less pentane will be cracked and traces of $C_{6+}$ hydrocarbon will appear. In a similar manner, increased pressure within the zone will produce a greater degree of cracking while reduced pressure will produce a lesser degree of cracking. The residence time within the conditioning zone will also affect the degree of cracking, with lower gas hourly space velocity resulting in a greater degree of cracking and with a higher gas hourly space velocity resulting in a lesser degree of cracking. The optimum degree of hydrocracking within the conditioning zone is reached where all $C_{6+}$ hydrocarbons are hydrocracked to lower molecular weight hydrocarbons without excessive cracking of the pentane and lighter hydrocarbons thereby minimizing hydrogen consumption within the conditioning zone and maximizing the percent of hydrogen remaining in the effluent gas. The operating conditions which may be required to obtain this optimum degree of hydrocracking for any specific reformer off-gas composition may be readily ascertained by those skilled in the art.

The effectiveness of the reduction of $C_{6+}$ hydrocarbon in the reformer off-gas may be enhanced by conducting the hydrocracking reaction in the presence of suitable catalyst. Such catalyst may comprise a hydrocracking catalyst composition or a hydrodealkylation catalyst composition.

Where a hydrodealkylating catalyst is employed in the conditioning zone, the reduction of $C_{6+}$ in the hydrogen-rich gas will be substantially equivalent to that set forth in Table I above. However, the advantage of using the hydrodealkylation catalyst in the reaction zone is twofold. First, hydrogen-rich reformer gas will normally contain aromatic hydrocarbon vapors in the neighborhood of 500 parts per million and by employing a hydrodealkylation catalyst the aromatic hydrocarbon will pass through the reaction zone with the ring intact. However, the alkyl groups on the aromatic ring will be removed, and non-cyclic hydrocarbon vapors will be cracked to less than 6 carbon atoms per molecule. Therefore, the aromatic hydrocarbon vapor passes through the conditioning zone without being destroyed and the resulting effluent gas will contain benzene vapor which then forms a reactant in the subsequent hydrogenation zone wherein cyclohexane is produced and thereby enhances the yield of cyclohexane. The second advantage of employing a hydrodealkylating catalyst is that the temperature level which is necessary to obtain a $C_{6+}$ reduction equivalent to what is obtained by thermal-hydrocracking, is 50° F. to 100° F. lower. This lower temperature level will allow the reactor vessel in the cracking zone to be of a milder alloy composition and/or a lesser vessel wall thickness, thus effecting economy in vessel and piping fabrication.

Hydrodealkylating the hydrocarbon vapors in the reformer gas may be undertaken at a temperature in the range of from about 1000° F. to about 1500° F. and at a pressure in the range of from about 100 to about 1000 p.s.i.g. Normally, the hydrodealkylation reaction may be obtained at pressures of about 500 p.s.i.g. to 600 p.s.i.g., which means that the conditioning zone 6 may be operated at the pressure of the reformer feeding the hydrogen-rich gas to the zone, or it may be operated at the pressure of the subsequent hydrogenation reactor 11 wherein cyclohexane is produced. Thus, extra compressor facilities are not required under these circumstances. The gas hourly space velocity that may be required within the conditioning zone may be readily ascertained by those skilled in the art.

The catalyst which may be utilized in the hydrodealkylation zone may comprise a metal composited on a solid support or carrier, where the metal is selected from the platinum group of the Periodic Table. In addition, other metals may be utilized including cesium, tungsten, silver, rhenium, and chromium. A particularly preferred catalyst which may be utilized in the hydrodealkylation zone comprises a Group VI–B metal composited on a suitable refractory inorganic oxide such as alumina, and more particularly, it may comprise a catalyst consisting of 10% to 20% by weight of chromium oxide on an alumina base. Further catalysts which may be utilized are prepared by co-precipitating alumina and at least one oxide of a metal selected from the group consisting of tin, titanium, and zirconium, calcining the resulting precipitate, and thereafter compositing with the calcined precipitate at least one oxide of a metal selected from the group consisting of chromium, molybdenum, and tungsten, and preferably consisting of chromium.

When a hydrocracking catalyst is employed in this invention, the conditioning zone 6 may be maintained under a pressure in the range of from about 100 p.s.i.g. to 3000 p.s.i.g., but preferably in excess of 500 p.s.i.g., and at a temperature of from about 500° F. to 1000° F. As a general rule, hexane and heavier hydrocarbons will not begin to hydrocrack unless the temperature is above 700° F. for most catalysts and it is, therefore, preferred that the reactor be maintained at a temperature in excess of 700° F.

The advantage of using a hydrocracking catalyst is also twofold. First, the catalyst will substantially reduce the $C_6+$ content of the hydrogen-rich reformer gas at substantially lower temperatures than may be employed in thermal hydrocracking or in hydrodealkylation systems, e.g. about 500° F. lower, thereby allowing the reactor system to operate with a milder alloy vessel thus saving substantial capital expense. The second advantage of using a hydrocracking catalyst is that the oxides of carbon, such as carbon monoxide and carbon dioxide, as well as other oxygen compounds which are inherent in reformer off-gas, will be hydrogenated to produce methane and water thereby eliminating a need for the methanation reaction zone 8 shown in the attached figure. This also will result in a substantial savings of capital expense.

Catalyst which may be used for hydrocracking in conditioning zone 6 may consist of a cracking catalyst such as a composite of silica and alumina. It is preferable, however, that the catalyst contain metallic components in the amount of from about 0.1% to about 20% by weight of the total catalyst, wherein the metallic components are selected from the metals of Group VI–B and VIII of the Periodic Table, and includes platinum, palladium, rhodium, iridium, nickel, tungsten, and/or molybdenum. The particular catalytically active metallic component or components which are utilized may be composited with any suitable solid carrier material which may be either naturally occurring or synthetically prepared. Naturally occurring material includes various aluminum silicates, particularly when acid treated to increase the activities thereof, various alumina-containing clays, sands, earths, and so forth, while synthetically prepared catalyst components generally include at least a portion of silica and alumina. Other suitable carrier material components which may be utilized include zirconia, magnesia, boria, thoria, titania, etc.

A preferred catalytic support comprises a composite of silica and alumina. A specifically preferred catalyst comprises from 2.0% to about 10.0% by weight of nickel and a composite of silica and alumina. Other preferred catalysts comprise from 2.0% to about 10.0% by weight of nickel with from 0.1% to 2.0% by weight of either platinum or palladium and a composite of silica and alumina.

Another preferred catalytic support comprises a crystalline alumino-silicate, especially faujasite and mordenite. For optimum cracking activity such crystalline alumino-silicate preferably is in the hydrogen form or in the divalent form and it preferably has pore openings of at least 6 angstroms. Such "molecular sieve" catalyst base may be composited with one or more metals of Group VI–B and Group VIII of the Periodic Table. A preferred molecular sieve catalyst comprises nickel on faujasite. Other preferred catalysts comprise palladium or platinum on faujasite and nickel, platinum or palladium on mordenite. The crystalline alumino-silicate may also be dispersed in an organic oxide matrix such as amorphous silica, alumina, or silica-alumina.

It may be seen that the invention disclosed herein greatly simplifies the use of hydrogen-rich reformer off-gas which has been contaminated with hydrocarbon vapor. This invention eliminates the need for gas absorption and stripping columns, for solid bed adsorption and stripping facilities, and for refrigeration and recovery facilities in pretreating the reformer off-gas before it is fed to the hydrogenation reactor for producing cyclohexane. These involved operating procedures and complex equipment installations are replaced by this invention with a single reaction chamber, which may or may not contain catalyst as set forth hereinabove, and with simple heat transfer facilities. In addition, when a hydrocracking catalyst is utilized in the conditioning zone, the methanation reactor system is eliminated from the cyclohexane manufacturing unit. It is further to be noted that the final cyclohexane effluent need only be stabilized to remove light hydrocarbon vapor and that no superfractionation, azeotropic distillation, or rerunning of the final cyclohexane product is necessary by the use of this inventive process.

It must also be noted that whereas the prior art seeks to remove hydrocarbons from the reformer vent gas and increase the hydrogen concentration before feeding the off-gas to the benzene hydrogenation zone, the process of the present invention preferably removes no hydrocarbons from the reformer off-gas and, in fact, the off-gas has a reduced hydrogen concentration when fed to the benzene hydrogenation zone. The hydrogen-rich gas leaves the conditioning zone and passes to the benzene hydrogenation zone without intervening separation or recovery of hydrocarbons, and the gas therefore contains as many lb.-mols of carbon atoms per lb.-mol of gas as was contained in the original reformer off-gas. By elimination of hydrocarbon separation and recovery facilities capital expense is reduced, and when a hydrodealkylation catalyst is utilized in the conditioning zone all resulting benzene vapor remains in the hydrogen-rich gas thereby enhancing cyclohexane yield as previously noted hereinabove.

It is to be noted that while the process of this invention has been specifically disclosed with reference to the hydrogenation of benzene to produce cyclohexane, the inventive process is equally applicable to any use wherein a hydrogen-rich stream must be decontaminated of hydrocarbon vapors. It is further to be noted that where a catalyst is employed for hydrocracking the hydrocarbon vapors, such catalyst may be contained as a fixed bed, a fluid bed, a suspensoid bed, or in any other manner whereby the molecular weight of the hydrocarbon vapors may be reduced within the conditioning zone.

The invention claimed is:

1. Process for the production of cyclohexane from a benzene feed and from a hydrogen feed containing hydrocarbon vapor having six or more carbon atoms per molecule, which comprises:
   (a) passing said hydrogen feed into a conditioning zone under conditions sufficient to hydrocrack substantially all of said hydrocarbon vapor to less than six carbon atoms per molecule;
   (b) withdrawing from said conditioning zone a first effluent stream comprising hydrogen and hydrocarbon vapors having substantial freedom from hydrocarbons having six or more carbon atoms per molecule;
   (c) passing said first effluent stream and said benzene feed into a reaction zone containing a hydrogenation catalyst under conditions sufficient to hydrogenate benzene;
   (d) withdrawing from said reaction zone a second effluent stream comprising hydrogen, cyclohexane, and hydrocarbon vapors having substantial freedom from hydrocarbons having six or more carbon atoms per molecule; and (e) recovering cyclohexane from said second effluent stream.

2. Process of claim 1 wherein said conditioning zone is maintained under a pressure of from about 100 p.s.i.g. to about 3000 p.s.i.g. and at a temperature of from about 1000° F. to about 1500° F.

3. Process of claim 1 wherein said conditioning zone contains a catalyst comprising a composite of silica and alumina.

4. Process of claim 1 wherein said conditioning zone contains a catalyst comprising at least one metallic component selected from the metals of Group VI–B and VIII of the Periodic Table.

5. Process of claim 4 wherein said conditioning zone is maintained under a pressure of from about 100 p.s.i.g. to about 3000 p.s.i.g. and at a temperature of from about 500° F. to about 1000° F.

6. Process of claim 4 wherein said catalyst comprises from about 2.0% to about 10.0% by weight of nickel and a composite of silica and alumina.

7. Process of claim 6 wherein said catalyst comprises from about 2.0% to about 10.0% by weight of nickel, from about 0.1% to about 2.0% by weight of at least one metal from the group consisting of platinum and palladium, and a composite of silica and alumina.

8. Process of claim 1 wherein said conditioning zone contains a catalyst comprising at least one metallic component selected from the metals of Groups VI–B and VIII of the Periodic Table and at least one crystalline aluminosilicate selected from the group consisting of faujasite and mordenite.

9. Process for the production of cyclohexane from a benzene feed and from a hydrogen feed containing hydrocarbon vapor having six or more carbon atoms per molecule, said vapor consisting of cyclic-hydrocarbon vapor and non-cyclic hydrocarbon vapor, which comprises:

(a) passing said hydrogen feed into a conditioning zone containing a hydrodealkylation catalyst under conditions sufficient to hydrocrack substantially all of said non-cyclic hydrocarbon vapor to less than six carbon atoms per molecule, and sufficient to hydrodealkylate substantially all of said cyclic-hydrocarbon vapor to cyclic-hydrocarbon vapor having six carbon atoms per molecule;

(b) withdrawing from said conditioning zone a first effluent stream comprising hydrogen, cyclic-hydrocarbon vapor having six carbon atoms per molecule, and non-cyclic hydrocarbon vapor having substantial freedom from hydrocarbons having six or more atoms per molecule;

(c) passing said first effluent stream, without intervening separation, and said benzene feed into a reaction zone containing a hydrogenation catalyst under conditions sufficient to hydrogenate benzene;

(d) withdrawing from said reaction zone a second effluent stream comprising hydrogen, cyclohexane, and noncyclic hydrocarbon vapors having substantial freedom from hydrocarbons having six or more carbon atoms per molecule; and (e) recovering cyclohexane from said second effluent stream.

10. Process of claim 9 wherein said conditioning zone is maintained at a pressure in the range of from about 100 p.s.i.g. to about 1000 p.s.i.g. and at a temperature in the range of from about 1000° F. to about 1500° F.

11. Process of claim 9 wherein said hydrodealkylation catalyst comprises alumina and at least one metallic component selected from the metals of Group VI–B of the Periodic Table.

12. Process of claim 11 wherein said hydrodealkylation catalyst comprises from 10% to 20% by weight of chromia on alumina.

13. Process of claim 11 wherein said catalyst contains at least one metallic component selected from the group of metals consisting of tin, titanium, and zirconium.

References Cited

UNITED STATES PATENTS

| | | | |
|---|---|---|---|
| 2,934,573 | 4/1960 | Paulsen | 260—667 |
| 2,937,134 | 5/1960 | Bowles | 208—216 |
| 3,213,150 | 10/1965 | Cabbage | 260—667 |
| 3,213,151 | 10/1965 | Sherk | 260—667 |
| 2,755,317 | 7/1956 | Kessel | 260—667 |
| 3,328,476 | 6/1967 | Cabbage | 260—667 |

DELBERT E. GANTZ, *Primary Examiner.*

V. O'KEEFE, *Assistant Examiner.*

U.S. Cl. X.R.

260—666